United States Patent
Chiu

(10) Patent No.: US 12,271,238 B2
(45) Date of Patent: Apr. 8, 2025

(54) ILLUMINATED TOUCH MODULE HAVING LIGHT GUIDE PLATE

(71) Applicant: Chicony Power Technology Co., Ltd., New Taipei (TW)

(72) Inventor: Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/331,959

(22) Filed: Jun. 9, 2023

(65) Prior Publication Data
US 2023/0409131 A1    Dec. 21, 2023

Related U.S. Application Data

(63) Continuation-in-part of application No. 17/817,652, filed on Aug. 4, 2022, now Pat. No. 11,675,119.

(30) Foreign Application Priority Data

Jun. 16, 2022   (TW) ................................. 111122506

(51) Int. Cl.
*G02B 6/00*       (2006.01)
*F21V 8/00*       (2006.01)
(Continued)

(52) U.S. Cl.
CPC ......... *G06F 1/1684* (2013.01); *G02B 6/0036* (2013.01); *G02B 6/0055* (2013.01); *G02B 6/006* (2013.01); *G06F 3/03547* (2013.01); *G06F 3/033* (2013.01); *G06F 3/04895* (2013.01); *G06F 2203/04107* (2013.01)

(58) Field of Classification Search
CPC ...... G02B 6/0055; G02B 6/004; G02B 6/006; G02B 6/0068; G02B 6/0081
See application file for complete search history.

(56) References Cited

U.S. PATENT DOCUMENTS 7,845,826 B2    12/2010   Aylward et al.
8,172,444 B2    5/2012   Chan et al.
(Continued)

FOREIGN PATENT DOCUMENTS

CN        204329091 U    5/2015
CN        204390647 U    6/2015
(Continued)

*Primary Examiner* — Joseph L Williams
(74) *Attorney, Agent, or Firm* — CKC & Partners Co., LLC

(57) ABSTRACT

An illuminated touch module includes a base sheet, a light-shielding sheet, a light guide plate, a light-emitting element, and a cover plate. The base sheet is disposed on a circuit board and has a light reflection area. The light-shielding sheet is disposed above the base sheet and has a side surface and a notch recessed from the side surface. An opening of the notch is aligned with an edge of the base sheet. The light guide plate is embedded in the notch and located above the light reflection area. The light guide plate has a light guide pattern formed by microstructures and has a light incident surface. The light-emitting element is disposed on the circuit board and has a light outputting surface facing the light incident surface and the light guide pattern. The cover plate covers above the light guide plate and the light-shielding sheet.

20 Claims, 16 Drawing Sheets

(51) Int. Cl.
   *G06F 1/16*      (2006.01)
   *G06F 3/0354*    (2013.01)
   *G06F 3/041*     (2006.01)
   *G06F 3/033*     (2013.01)
   *G06F 3/04895*   (2022.01)

(56) References Cited

U.S. PATENT DOCUMENTS

| | | |
|---|---|---|
| 9,887,052 B1 | 2/2018 | Lin et al. |
| 2009/0183976 A1 | 7/2009 | Chang |
| 2010/0097246 A1 | 4/2010 | Watanabe et al. |
| 2010/0259485 A1 | 10/2010 | Chuang |
| 2012/0257151 A1* | 10/2012 | Teramoto ............ G02F 1/13458 349/106 |
| 2014/0326589 A1 | 11/2014 | Shiu |
| 2021/0064156 A1 | 3/2021 | Ho et al. |

FOREIGN PATENT DOCUMENTS

| | | |
|---|---|---|
| CN | 103873627 B | 3/2017 |
| CN | 206489351 U | 9/2017 |
| CN | 109388293 A | 2/2019 |
| CN | 105892152 B | 4/2019 |
| CN | 107092311 B | 3/2020 |
| TW | M412410 U1 | 9/2011 |
| TW | I409677 B | 9/2013 |
| TW | I669647 B | 8/2019 |
| TW | 202036244 A | 10/2020 |
| TW | 202109935 A | 3/2021 |
| TW | M612898 U | 6/2021 |
| TW | I732663 B | 7/2021 |
| TW | I737439 B | 8/2021 |
| TW | I749713 B | 12/2021 |
| TW | 202206996 A | 2/2022 |

* cited by examiner

ILLUMINATED TOUCH MODULE HAVING LIGHT GUIDE PLATE

CROSS-REFERENCE TO RELATED APPLICATION

This application is a Continuation-in-part of U.S. application Ser. No. 17/817,652, filed on Aug. 4, 2022, now U.S. Pat. No. 11,675,119, issued Jun. 13, 2023, which claims priority of Taiwan Application Serial Number 111122506, filed Jun. 16, 2022, the entirety of which is herein incorporated by reference.

BACKGROUND

Technical Field

The present disclosure relates to an illuminated touch module.

Description of Related Art

The appearances of traditional touch modules are usually monotonous and dull, so computer peripheral manufacturers have developed illuminated touch modules with excellent visual effects. The backlight assemblies used in the traditional illuminated touch modules are composed of two parts, which are the light-shielding layer and light guide plate from top to bottom.

As the number of functions continues to increase, so does the markings on the illuminated touch module. If these button icons only share the same light guide plate, a single button icon cannot be displayed or marked independently. In order to enable each button icon on the illuminated touch module to emit light independently, generally, a light source needs to be disposed directly below each button icon, which belongs to the design of direct Illumination-type. However, the design of direct Illumination-type requires a fixed light mixing distance to produce uniform light. However, the light mixing distance cannot reduce the thickness of the illuminated touch module and reduce the sensitivity of the touch sensor.

Accordingly, how to provide an illuminated touch module to solve the aforementioned problems becomes an important issue to be solved by those in the industry.

SUMMARY

An aspect of the disclosure is to provide an illuminated touch module that can efficiently solve the aforementioned problems.

According to an embodiment of the disclosure, an illuminated touch module includes a base sheet, a light-shielding sheet, a light guide plate, a light-emitting element, and a cover plate. The base sheet is disposed on a circuit board and has a top surface. The top surface has a light reflection area. The light-shielding sheet is disposed above the base sheet and has a side surface and a notch recessed from the side surface. An opening of the notch is aligned with an edge of the base sheet. The light guide plate is embedded in the notch and located above the light reflection area. The light guide plate has a light guide pattern formed by a plurality of microstructures and has a light incident surface. The light-emitting element is disposed on the circuit board and has a light outputting surface facing the light incident surface and the light guide pattern. The cover plate covers above the light guide plate and the light-shielding sheet.

In an embodiment of the disclosure, the light guide pattern is spaced apart from the opening of the notch by a first distance. The light guide pattern is spaced apart from the light-emitting element by a second distance. The second distance is greater than the first distance.

In an embodiment of the disclosure, the light-shielding sheet has a light blocking portion at a side of the opening of the notch.

In an embodiment of the disclosure, the light guide plate has a light-shielding area disposed corresponding to the opening of the notch.

In an embodiment of the disclosure, the illuminated touch module further includes a light-shielding element at least covers the edge of the base sheet.

In an embodiment of the disclosure, the light-shielding element is disposed on a surface of the cover plate facing the base sheet.

In an embodiment of the disclosure, the light-shielding element further extends to a surface of the circuit board away from the cover plate.

In an embodiment of the disclosure, the light-shielding sheet is adhered to the circuit board through an adhesive layer and spaced apart from the base sheet.

In an embodiment of the disclosure, the light-shielding sheet further has an air passage communicating the notch to the side surface.

In an embodiment of the disclosure, the air passage extends curvedly from the notch to the side surface.

According to an embodiment of the disclosure, an illuminated touch module includes a base sheet, a light-shielding sheet, a light guide plate, a first light-emitting element, a second light-emitting element, and a cover plate. The base sheet is disposed on a circuit board and has a top surface. The top surface has a first light reflection area and a second light reflection area. The light-shielding sheet is disposed above the base sheet and has a side surface, a first notch, and a second notch. The first notch and the second notch are recessed from the side surface. An opening of the first notch and an opening of the second notch are aligned with an edge of the base sheet. The light guide plate includes a first light guide region and a second light guide region respectively embedded in the first notch and the second notch and respectively located above the first light reflection area and the second light reflection area. The first light guide region has a first light guide pattern formed by a plurality of microstructures and has a light incident surface. The second light guide region has a second light guide pattern formed by a plurality of microstructures and has a light incident surface. The first light-emitting element is disposed on the circuit board and has a light outputting surface facing the light incident surface and the first light guide pattern of the first light guide region. The second light-emitting element is disposed on the circuit board and has a light outputting surface facing the light incident surface and the second light guide pattern of the second light guide region. The cover plate covers above the first light guide region, the second light guide region, and the light-shielding sheet. The cover plate has a first pattern and a second pattern disposed corresponding to the first light guide pattern and the second light guide pattern respectively. The first light guide pattern is spaced apart from the opening of the first notch by a first distance. The first light guide pattern is spaced apart from the first light-emitting element by a second distance. The second distance is greater than the first distance.

In an embodiment of the disclosure, the first light guide region has a light-shielding area disposed corresponding to the opening of the first notch.

In an embodiment of the disclosure, the first notch has a bottom opposite to the opening of the first notch. A width of the opening of the first notch is smaller than a width of the bottom.

In an embodiment of the disclosure, the illuminated touch module further includes a light-shielding element at least covers the edge of the base sheet.

In an embodiment of the disclosure, the light-shielding element is disposed on a surface of the cover plate facing the base sheet.

In an embodiment of the disclosure, the light-shielding element further extends to a surface of the circuit board away from the cover plate.

In an embodiment of the disclosure, the light-shielding sheet is adhered to the circuit board through an adhesive layer and spaced apart from the base sheet.

In an embodiment of the disclosure, the light-shielding sheet further has an air passage communicating the first notch to the side surface.

In an embodiment of the disclosure, the air passage extends curvedly from the first notch to the side surface.

In an embodiment of the disclosure, the light guide plate further includes a connecting portion connected to the first light guide region and the second light guide region.

Accordingly, in the illuminated touch module of the present disclosure, the first light-emitting element and the second light-emitting element emit light toward the first light guide region and the second light guide region of the light guide plate, respectively. Moreover, the light guide plate is embedded in the hollow portion or the notch of the light-shielding sheet, and the light blocking portion of the light-shielding sheet is disposed between the first light guide region and the second light guide region. In this way, the light blocking portion of the light-shielding sheet can isolate the light emitted by the first light-emitting element and the second light-emitting element without interfering with each other, so that the first pattern and the second pattern on the cover plate can be displayed independently. In some embodiments, at least one of the first light-emitting element and the second light-emitting element is disposed on the wall surface of the hollow portion and configured to emit light toward the light blocking portion, or disposed on the wall surface of the light blocking portion and configured to emit light away from the light blocking portion. In some embodiments, the light guide plate has a connecting portion with two ends respectively connected to the first light guide region and the second light guide region, and the connecting portion has a bent portion. In this way, the light emitted by the first light-emitting element needs to go through more than two turns before reaching the second light guide region, or the light emitted by the second light-emitting element needs to go through more than two turns before reaching the first light guide region, thereby ensuring that the light emitted by the first light-emitting element and the second light-emitting element do not interfere with each other. Moreover, compared with separated light guide blocks, connecting the first light guide region and the second light guide region by the connecting portion as disclosed in the present embodiment can facilitate the assembly and alignment of the light guide plate.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
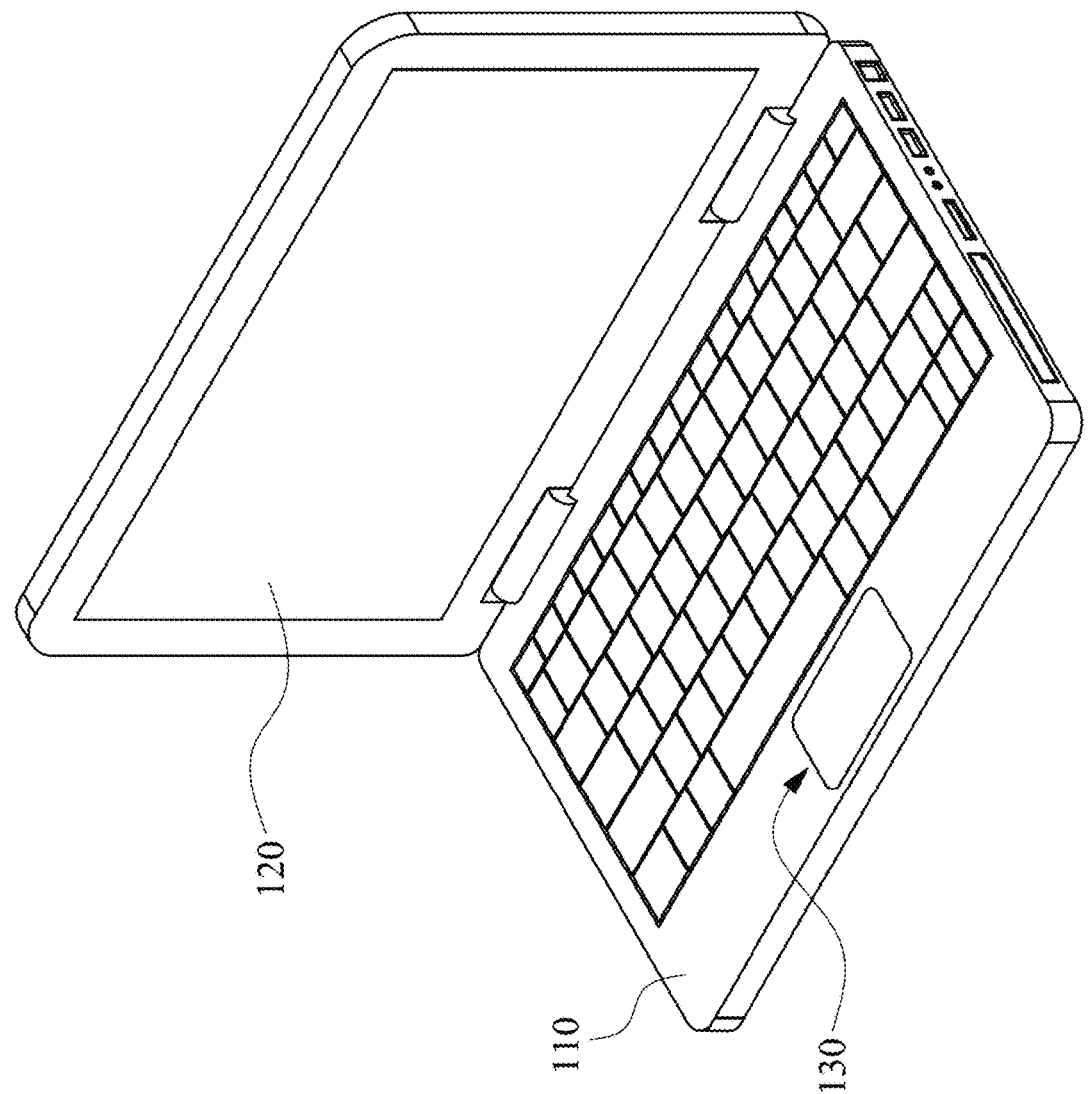
FIG. 1 is a perspective view of an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an electronic device 100 according to an embodiment of the disclosure. As shown in FIG. 1, in the present embodiment, the electronic device 100 includes a host 110, a display 120, and an illuminated touch module 130. The illuminated touch module 130 is an input device disposed in the host 110, but the present disclosure is not limited in this regard. In practical applications, the illuminated touch module 130 can also be an electronic product (e.g., a personal digital assistant, a keyboard including a touchpad, etc.) using a touchpad as an input or operation interface. That is, concepts of the electronic device 100 of the present disclosure may be applied to any electronic product using a touchpad as an input or operation interface. The structures and functions of some elements included in the illuminated touch module 130 and the connections and operation relationships among these elements will be described in detail below.

Figure 2:
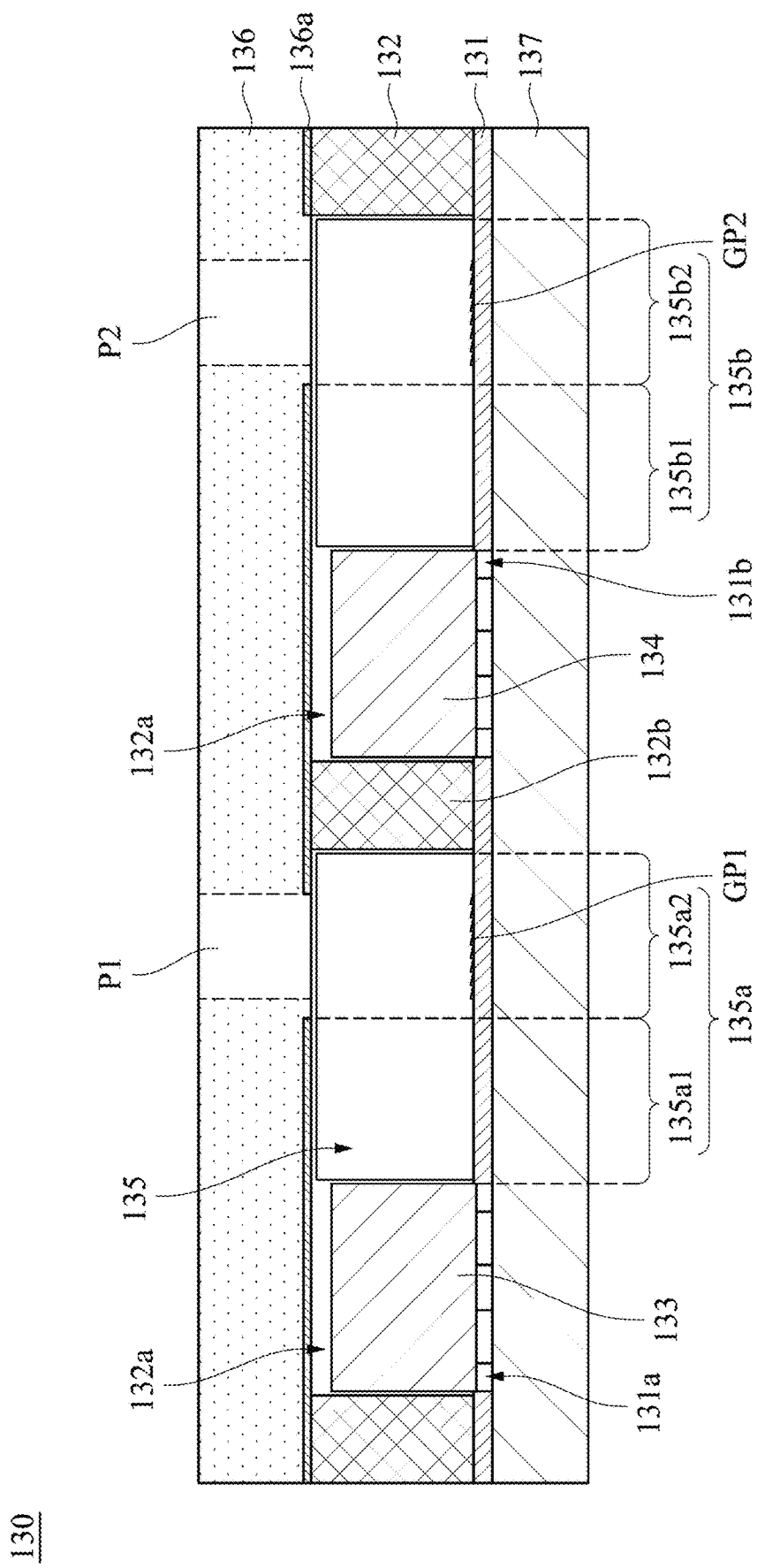
FIG. 2 is a schematic cross-sectional view of an illuminated touch module according to an embodiment of the disclosure.
Figure 3:
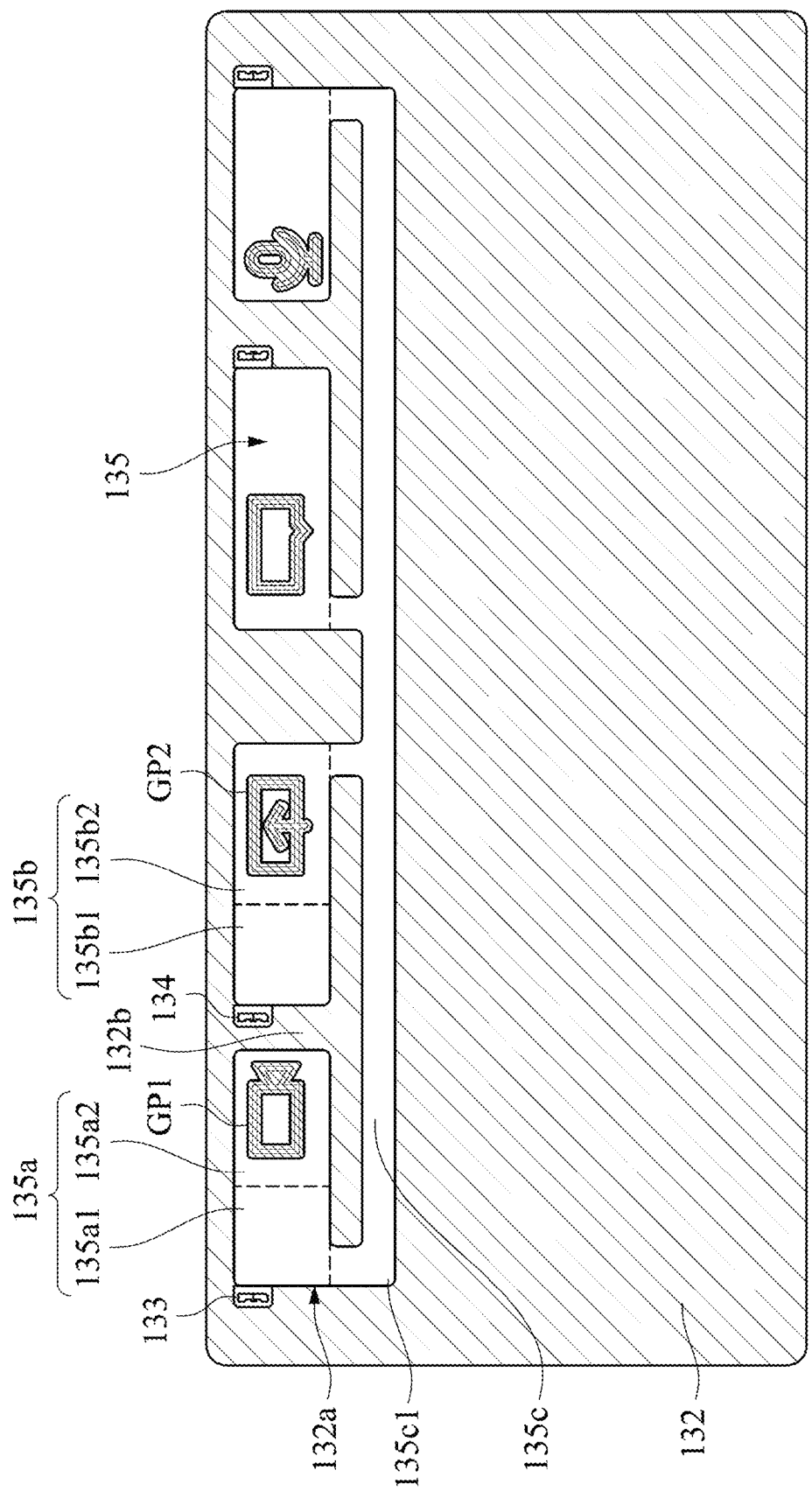
FIG. 3 is a front view of a light-shielding sheet and a light guide plate according to an embodiment of the disclosure.

Reference is made to FIGS. 2 and 3. FIG. 2 is a schematic cross-sectional view of the illuminated touch module 130 according to an embodiment of the disclosure. FIG. 3 is a front view of a light-shielding sheet 132 and a light guide plate 135 according to an embodiment of the disclosure. As shown in FIGS. 2 and 3, in the present embodiment, the illuminated touch module 130 is exposed by an opening of the housing of the host 110. The circuit board 137 may include touch circuits. The illuminated touch module 130 includes a reflection sheet 131, a light-shielding sheet 132, a first light-emitting element 133, a second light-emitting element 134, and a light guide plate 135. The reflection sheet 131 is disposed on the circuit board 137 and has a first through hole 131a and a second through hole 131b. The light-shielding sheet 132 is disposed on the reflection sheet 131 and has a hollow portion 132a. The hollow portion 132a has a closed contour. The first light-emitting element 133 and the second light-emitting element 134 are disposed on the circuit board 137, respectively accommodated in the first through hole 131a and the second through hole 131b of the reflection sheet 131, and located in the hollow portion 132a. The light guide plate 135 is embedded in the hollow portion 132a. The first light-emitting element 133 and the second light-emitting element 134 are configured to laterally emit light toward the light guide plate 135. Since the light guide plate 135 is embedded in the hollow portion 132a with a closed contour (meaning that the light-shielding sheet 132 completely surrounds the outer edge of the light guide plate 135), the light transmitted in the light guide plate 135 will be blocked by the light-shielding sheet 132 without leaking when reaching the outer edge of the light guide plate 135. Since the bottom of the light guide plate 135 is provided with the reflection sheet 131, it can be ensured that the light transmitted in the light guide plate 135 is only outputted from the top surface of the light guide plate 135.

As shown in FIG. 2, in the present embodiment, a thickness of the light-shielding sheet 132 is greater than a thickness of the light guide plate 135, a height of the first light-emitting element 133, and a height of the second light-emitting element 134. In this way, the light transmitted in the light guide plate 135 can be further prevented from laterally leaking.

In detail, the light guide plate 135 includes a first light guide region 135a and a second light guide region 135b. The first light guide region 135a has a first light mixing region 135a1 and a first light outputting region 135a2. The first light-emitting element 133 and the first light outputting region 135a2 are respectively located on opposite sides of the first light mixing region 135a1 laterally. The second light guide region 135b has a second light mixing region 135b1 and a second light outputting region 135b2. The second light-emitting element 134 and the second light outputting region 135b2 are respectively located on opposite sides of the second light mixing region 135b1 laterally. In this way, the light emitted by the first light-emitting element 133 can be uniformly mixed in the first light mixing region 135a1, and then transmitted to the first light outputting region 135a2 for light outputting. Similarly, the light emitted by the second light-emitting element 134 can be uniformly mixed in the second light mixing region 135b1, and then transmitted to the second light outputting region 135b2 for light outputting. It should be noted here that the hot spot is the brightest region in front of the light source (such as a light-emitting diode). When it appears on the light incident surface of the light guide plate, there will be obvious bright lines or bright arcs, resulting in obvious uneven brightness of the overall light effect. Therefore, in this embodiment, the light emitted by the first light-emitting element 133 and the second light-emitting element 134 are subjected to multiple total reflections in the first light mixing region 135a1 and the second light mixing region 135b1 respectively, so that the light mixing effect can be achieved.

As shown in FIG. 2, in the present embodiment, the first light outputting region 135a2 and the second light outputting region 135b2 respectively have a first light guide pattern GP1 and a second light guide pattern GP2 formed by a plurality of microstructures. In addition, the illuminated touch module 130 further includes a cover plate 136 disposed above the light guide plate 135 and the light-shielding sheet 132. A reflective layer 136a is provided on a side of the cover plate 136 facing the light guide plate 135. The reflective layer 136a vertically corresponds to the first light-emitting element 133, the second light-emitting element 134, and part of the light guide plate 135, and is used to reflect the upward scattered light back to the light guide plate 135, thereby increasing the utilization rate of light. The cover plate 136 further has a first pattern P1 and a second pattern P2 that are light transmissive and respectively correspond to the first light guide pattern GP1 and the second light guide pattern GP2 vertically. With these structural configurations, the light transmitted to the first light outputting region 135a2 will be reflected upward by the first light guide pattern GP1, and then pass through the first pattern P1 of the cover plate 136 to leave the cover plate 136, so that the user can clearly identify the first pattern P1 that is illuminated. Similarly, the light transmitted to the second light outputting region 135b2 will be reflected upward by the second light guide pattern GP2, and then pass through the second pattern P2 of the cover plate 136 to leave the cover plate 136, so that the user can clearly identify the second pattern P2 that is illuminated. In some embodiments, on the side of the cover plate 136 facing the light guide plate 135, the reflective layer 136a covers the area except the first pattern P1 and the second pattern P2 to increase the convenience of the process.

In some embodiments, the first light mixing region 135a1 is defined by the overlapping region of the orthographic projection of the reflective layer 136a projected on the first light guide region 135a, but the present disclosure is not limited in this regard. In some embodiments, the second light mixing region 135b1 is defined by the overlapping region of the orthographic projection of the reflective layer 136a projected on the second light guide region 135b, but the present disclosure is not limited in this regard.

Figure 4:
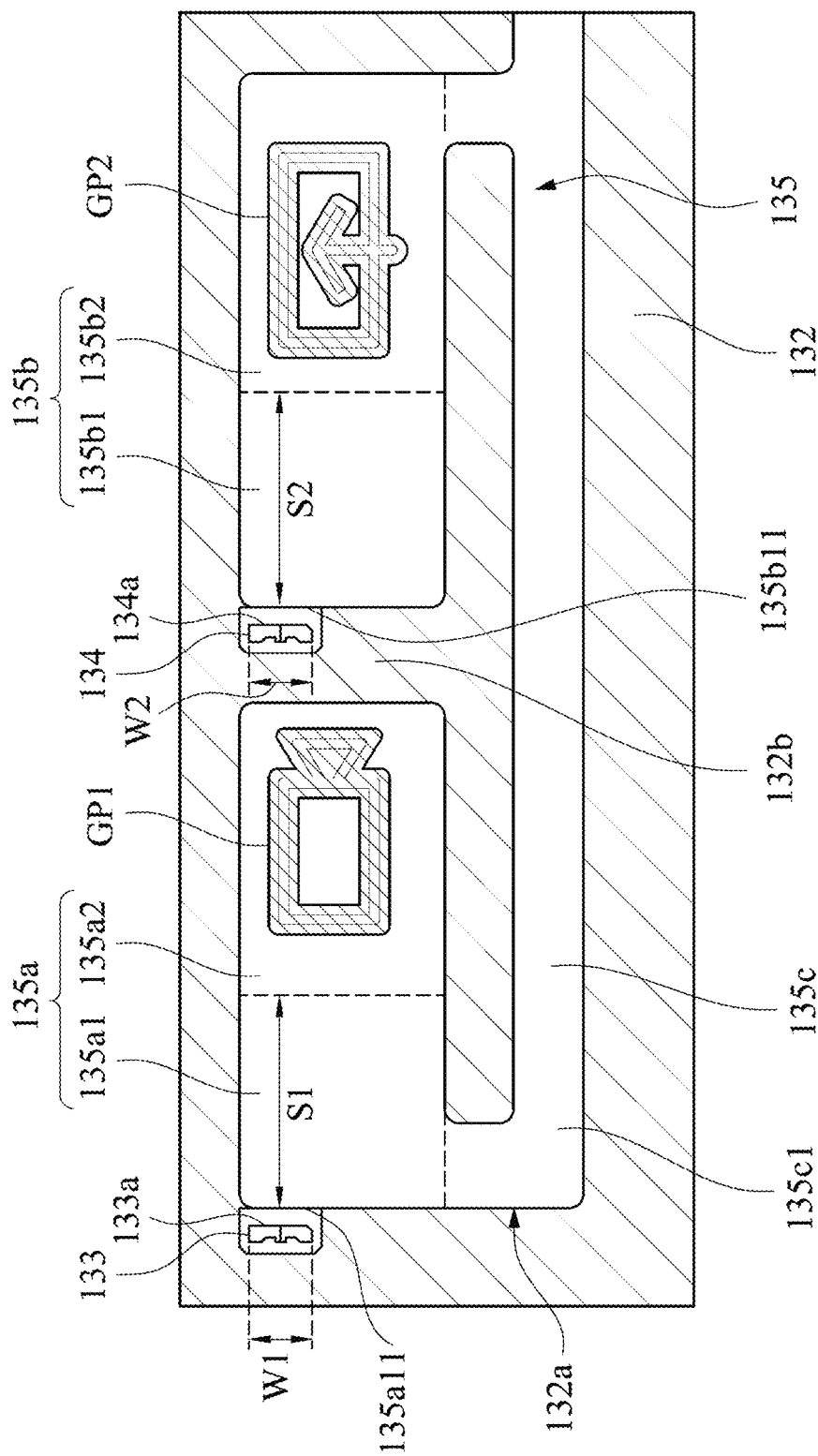
FIG. 4 is a partial enlarged view of the structure in FIG. 3.

Reference is made to FIG. 4. FIG. 4 is a partial enlarged view of the structure in FIG. 3. As shown in FIG. 4, in the present embodiment, a light outputting surface 133a of the first light-emitting element 133 has a first width W1. The first light mixing region 135a1 is a portion within a first distance S1 from a light incident surface 135a11 of the first light guide region 135a. The first distance S1 is at least about 1.5 times the first width W1. In this way, the light emitted by the first light-emitting element 133 can be sufficiently uniformly mixed in the first light mixing region 135a1.

As shown in FIG. 4, in the present embodiment, a light outputting surface 134a of the second light-emitting element 134 has a second width W2. The second light mixing region 135b1 is a portion within a second distance S2 from a light incident surface 135b11 of the second light guide region 135b. The second distance S2 is at least about 1.5 times the second width W2. In this way, the light emitted by the second light-emitting element 134 can be sufficiently uniformly mixed in the second light mixing region 135b1.

In practical applications, as shown in FIG. 3, the illuminated touch module 130 may further equipped with more or less number of light-emitting elements, and the light guide plate 135 may further include more or less number of light guide regions to correspond to the light-emitting elements respectively.

As shown in FIGS. 2 and 3, in the present embodiment, the light-shielding sheet 132 further has a light blocking portion 132b. The light blocking portion 132b laterally protrudes from the wall surface of the hollow portion 132a of the light-shielding sheet 132, and is disposed between the first light guide region 135a and the second light guide region 135b. In this way, the light blocking portion 132b of the light-shielding sheet 132 can isolate the light emitted by the first light-emitting element 133 and the second light-emitting element 134 without interfering with each other, so that the first pattern P1 and the second pattern P2 on the cover plate 136 can be displayed independently.

As shown in FIGS. 2 and 3, in the present embodiment, the first light-emitting element 133 is disposed on the wall surface of the hollow portion 132a, and is configured to emit light toward the light blocking portion 132b. In this way, the light emitted by the first light-emitting element 133 needs to go through more than two turns (e.g., via a connecting portion 135c with a bent portion 135c1 shown in FIGS. 3 and 4 and described below) before reaching the second light guide region 135b (i.e., the light emitted by the first light-emitting element 133 will not cause the second pattern P2 of the cover plate 136 to output light), thereby ensuring that the light emitted by the first light-emitting element 133 and the second light-emitting element 134 do not interfere with each other.

As shown in FIGS. 2 and 3, in the present embodiment, the second light-emitting element 134 is disposed on a wall surface of the light blocking portion 132b, and is configured to emit light away from the light blocking portion 132b. In this way, the light emitted by the second light-emitting element 134 needs to go through more than two turns (e.g., via the connecting portion 135c with the bent portion 135c1 shown in FIGS. 3 and 4 and described below) before reaching the first light guide region 135a (i.e., the light emitted by the second light-emitting element 134 will not cause the first pattern P1 of the cover plate 136 to output light), thereby ensuring that the light emitted by the first light-emitting element 133 and the second light-emitting element 134 do not interfere with each other.

In practical applications, the light-emitting elements can be flexibly disposed on the wall surface of the hollow portion 132a or the wall surface of the light blocking portion 132b, and do not limited to the embodiment shown in FIGS. 2 and 3.

As shown in FIGS. 3 and 4, in the present embodiment, the light guide plate 135 has the connecting portion 135c. Two ends of the connecting portion 135c are respectively connected to the first light guide region 135a and the second light guide region 135b. Compared with separated light guide blocks, connecting the first light guide region 135a and the second light guide region 135b by the connecting portion 135c as disclosed in the present embodiment can facilitate the assembly and alignment of the light guide plate 135. Specifically, the connection portion 135c has the bent portion 135c1. In this way, it is possible to further increase the difficulty that the light emitted by the first light-emitting element 133 and the light emitted by the second light-emitting element 134 interfere with each other.

As shown in FIGS. 3 and 4, in the present embodiment, the connecting portion 135c with the bent portion 135c1 is U-shaped, but the present disclosure is not limited in this regard.

Figure 5:
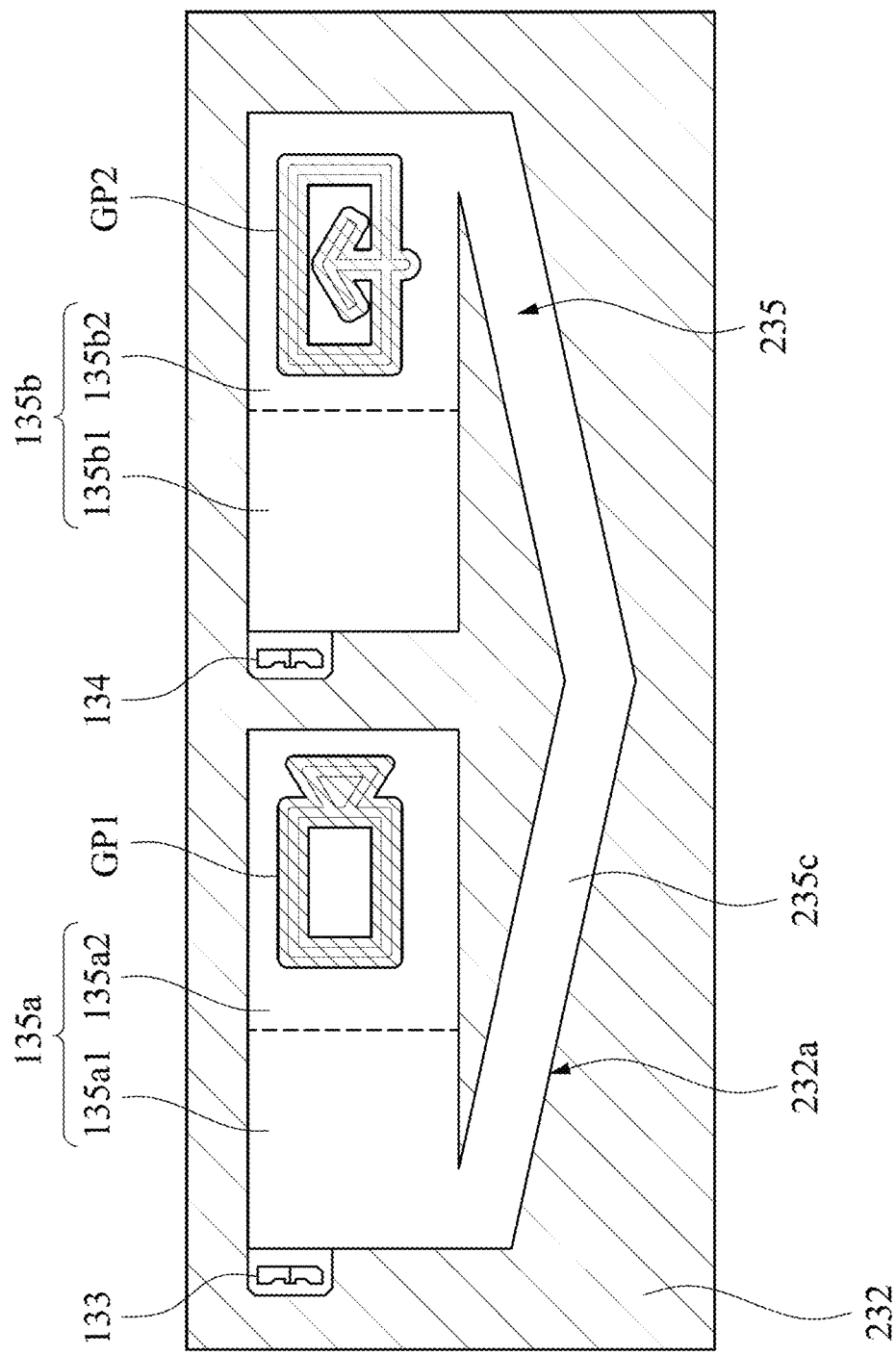
FIG. 5 is a partial enlarged view of a light-shielding sheet and a light guide plate according to another embodiment of the disclosure.

Reference is made to FIG. 5. FIG. 5 is a partial enlarged view of a light-shielding sheet 232 and a light guide plate 235 according to another embodiment of the disclosure. As shown in FIG. 5, in the present embodiment, the light-shielding sheet 232 has a hollow portion 232a. The hollow portion 232a has a closed contour. The light guide plate 235 is embedded in the hollow portion 232a. The light guide plate 235 includes a first light guide region 135a, a second light guide region 135b, and a connecting portion 235c, in which the first light guide region 135a and the second light guide region 135b are the same as or similar to those of the embodiment shown in FIG. 3, so reference can be made to the above related descriptions and will not be repeated here. A difference between the present embodiment and the embodiment shown in FIG. 3 is that the connecting portion 235c of the present embodiment is V-shaped, so the difficulty of mutual interference between the light emitted by the first light-emitting element 133 and the light emitted by the second light-emitting element 134 can also be increased.

In practical applications, the connecting portions 135c may be arranged between the first light guide region 135a and the second light guide region 135b and have a zigzag shape, which is not drawn.

As shown in FIG. 3, in the present embodiment, the width of the connecting portion 135c is smaller than the width of the first light guide region 135a and the width of the second light guide region 135b (e.g., the widths in the vertical direction in FIG. 3), but the present disclosure is not limited in this regard.

Figure 6:
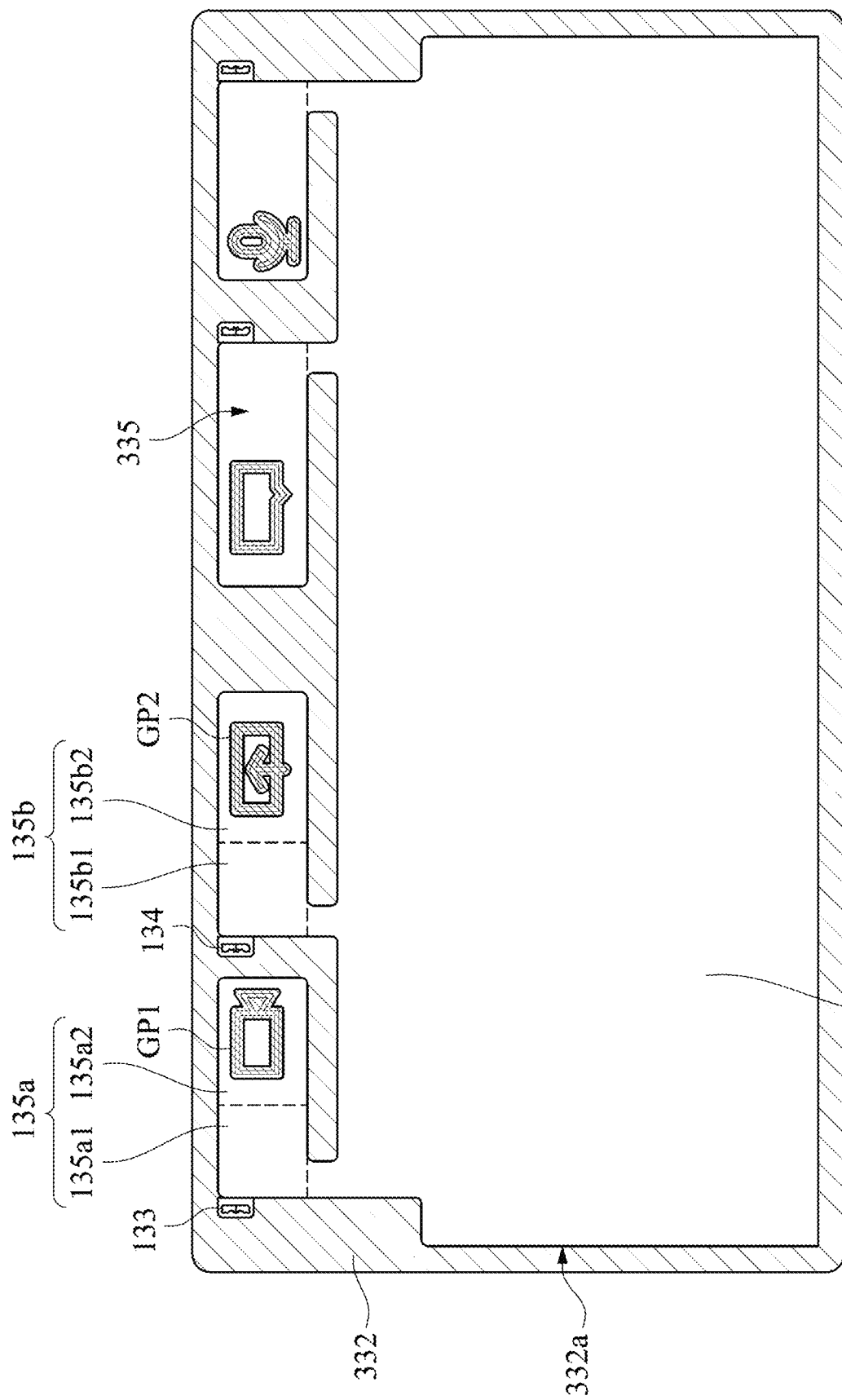
FIG. 6 is a front view of a light-shielding sheet and a light guide plate according to another embodiment of the disclosure.

Reference is made to FIG. 6. FIG. 6 is a front view of a light-shielding sheet 332 and a light guide plate 335 according to another embodiment of the disclosure. As shown in FIG. 6, in the present embodiment, the light-shielding sheet 332 has a hollow portion 332a. The hollow portion 332a has a closed contour. The light guide plate 335 is embedded in the hollow portion 332a. The light guide plate 335 includes a first light guide region 135a, a second light guide region 135b, and a connecting portion 335c, in which the first light guide region 135a and the second light guide region 135b are the same as or similar to those of the embodiment shown in FIG. 3, so reference can be made to the above related descriptions and will not be repeated here. A difference between the present embodiment and the embodiment shown in FIG. 3 is that the width of the connecting portion 335c in the present embodiment is larger than the width of the first light guide region 135a and the width of the second light guide region 135b (e.g., the widths in the vertical direction in FIG. 6).

In practical applications, a width of the connecting portion 135c may also be equal to the width of the first light guide region 135a and the width of the second light guide region 135b, which are not drawn here.

Figure 7:
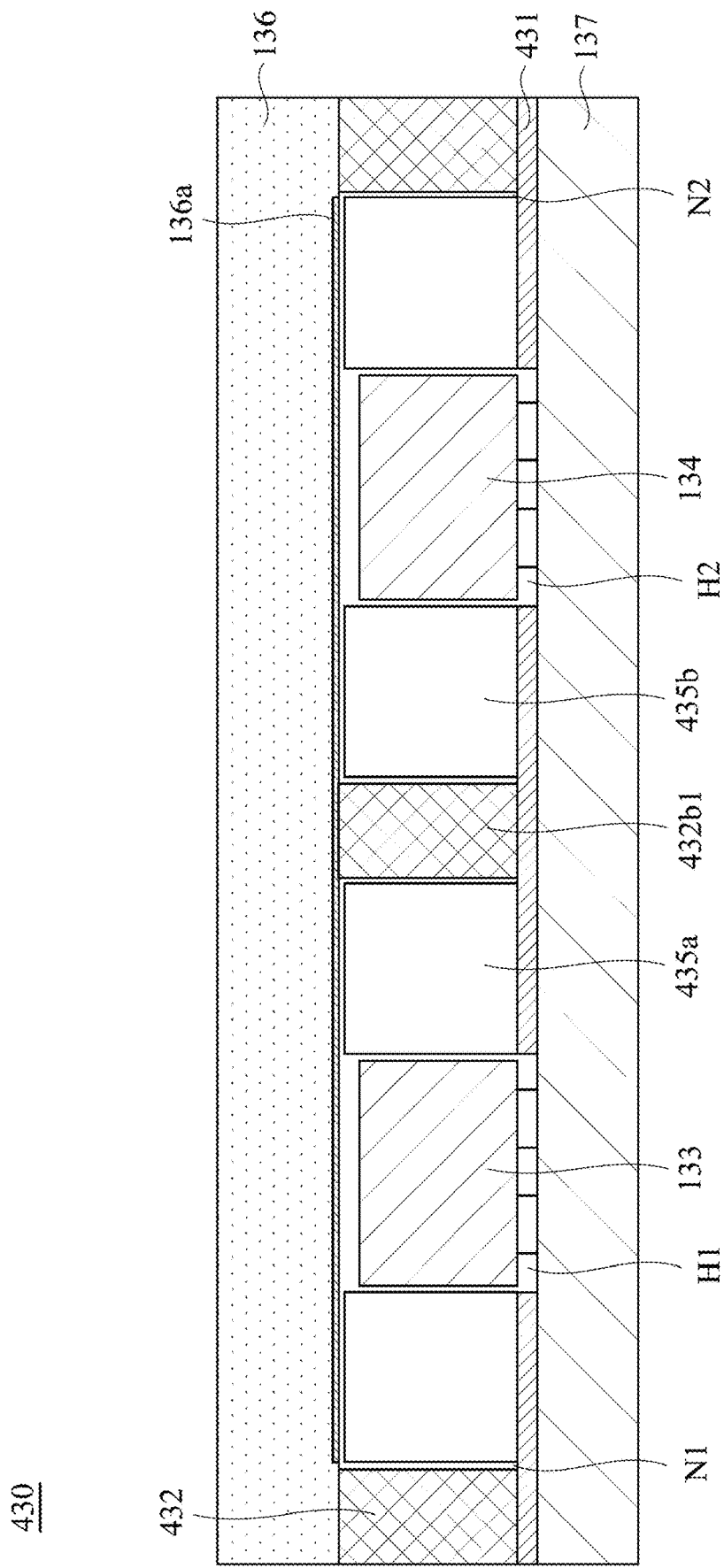
FIG. 7 is a schematic cross-sectional view of an illuminated touch module according to an embodiment of the disclosure.
Figure 8A:
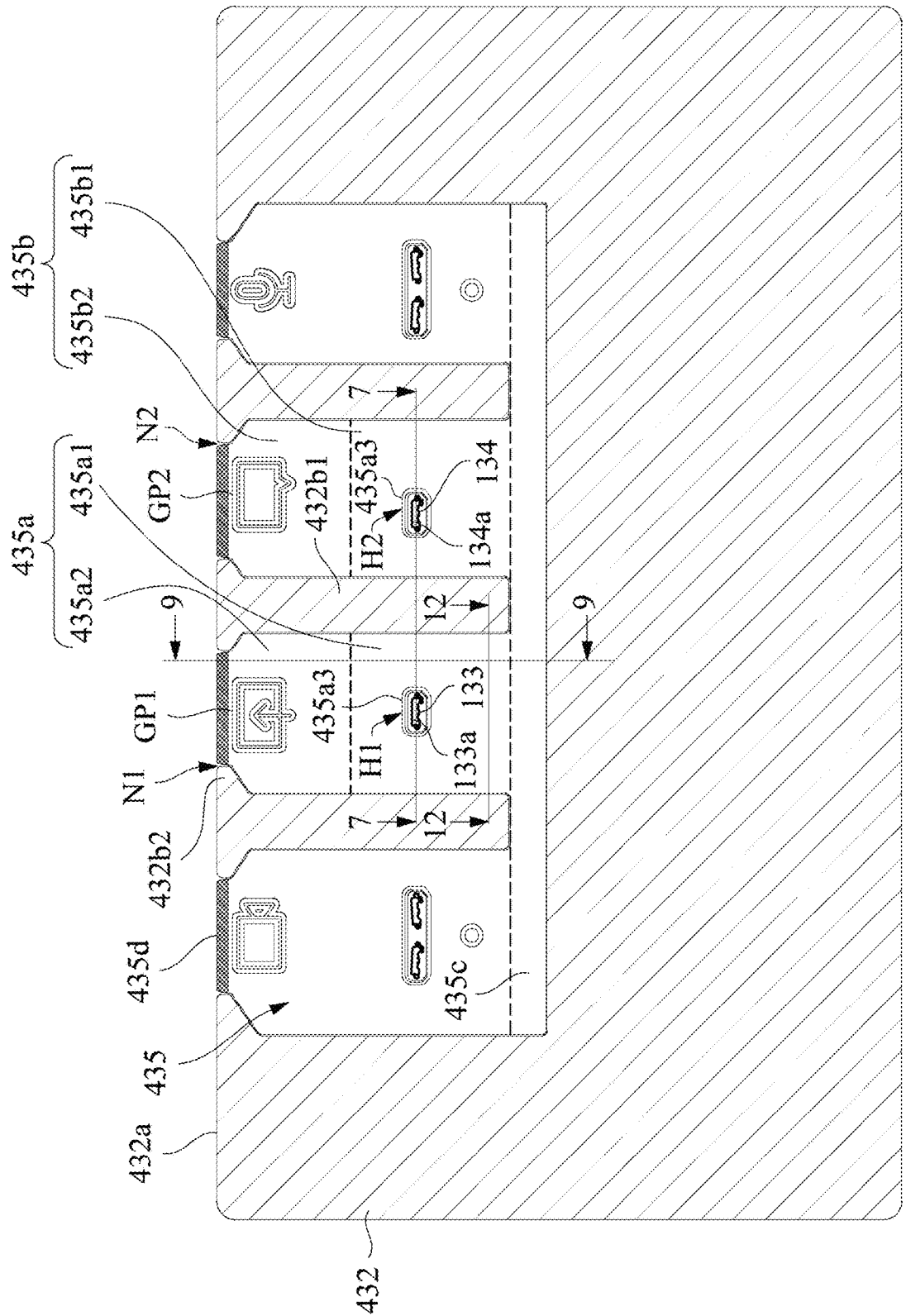
FIG. 8A is a front view of the illuminated touch module in FIG. 7.

Reference is made to FIGS. 7 and 8A. FIG. 7 is a schematic cross-sectional view of an illuminated touch module 430 according to an embodiment of the disclosure. FIG. 8A is a front view of the illuminated touch module 430 in FIG. 7. FIG. 7 corresponds to a cross section of illuminated touch module 430 taken along line 7-7 in FIG. 8A. As shown in FIGS. 7 and 8A, in the present embodiment, the illuminated touch module 430 includes a base sheet 431, a light-shielding sheet 432, a light guide plate 435, a first light-emitting element 133, a second light-emitting element 134, and a cover plate 136. The cover plate 136 is omitted in FIG. 7. The base sheet 431 is disposed on a circuit board 137 and has a top surface. The light-shielding sheet 432 is disposed above the base sheet 431 and has a side surface 432a, a first notch N1, and a second notch N2. The first notch N1 and the second notch N2 are recessed from the side surface 432a. An opening of the first notch N1 and an opening of the second notch N2 are aligned with an edge of the base sheet 431 (referring to FIG. 9). The light guide plate 435 includes a first light guide region 435a and a second light guide region 435b respectively embedded in the first notch N1 and the second notch N2 and located above the base sheet 431.

As shown in FIG. 7, the first light guide region 435a and the second light guide region 435b are respectively located above a first light reflection area and a second light reflection area of the top surface of the base sheet 431. In some embodiments, the first light reflection area and the second light reflection area constitute an entirety of the top surface. That is, the entirety of the top surface of the base sheet 431 is reflective. In some other embodiments, the first light reflection area and the second light reflection area are two separated areas of the top surface. In some other embodiments, the first light reflection area contacts an entirety of the bottom surface of the first light guide region 435a, and the second light reflection area contacts an entirety of the bottom surface of the second light guide region 435b. For example, the first light reflection area may be defined as the portion of the top surface of the base sheet 431 in contact with the entirety of the bottom surface of the first light guide region 435a, and the second light reflection area may be defined as the portion of the top surface of the base sheet 431 in contact with the entirety of the bottom surface of the second light guide region 435b.

As shown in FIGS. 7 and 8A, the first light guide region 435a has a first light mixing region 435a1 and a first light outputting region 435a2. The second light guide region 435b has a second light mixing region 435b1 and a second light outputting region 435b2. In this way, the light emitted by the first light-emitting element 133 can be uniformly mixed in the first light mixing region 435a1, and then transmitted to the first light outputting region 435a2 for light outputting. Similarly, the light emitted by the second light-emitting element 134 can be uniformly mixed in the second light mixing region 435b1, and then transmitted to the second light outputting region 435b2 for light outputting.

As shown in FIGS. 7 and 8A, a reflective layer 136a is provided on a side of the cover plate 136 facing the light guide plate 435. The reflective layer 136a vertically corresponds to the first light-emitting element 133, the second light-emitting element 134, and part of the light guide plate 435, and is used to reflect the upward scattered light back to the light guide plate 435, thereby increasing the utilization rate of light. In some embodiments, the first light mixing region 435a1 is defined by the overlapping region of the orthographic projection of the reflective layer 136a projected on the first light guide region 435a, but the present disclosure is not limited in this regard. In some embodiments, the second light mixing region 435b1 is defined by the overlapping region of the orthographic projection of the reflective layer 136a projected on the second light guide region 435b, but the present disclosure is not limited in this regard.

As shown in FIGS. 7 and 8A, the first light guide region 435a has a first light guide pattern GP1 formed by a plurality of microstructures and has a light incident surface 435a3. The second light guide region 435b has a second light guide pattern GP2 formed by a plurality of microstructures and has a light incident surface 435b3. A first accommodating space H1 extends in the base sheet 431 and the first light guide region 435a. Specifically, the first accommodating space H1 runs through the base sheet 431 and the first light guide region 435a in the embodiment as shown in FIG. 7. A second accommodating space H2 extends in the base sheet 431 and the second light guide region 435b. Specifically, the second accommodating space H2 runs through the base sheet 431 and the second light guide region 435b in the embodiment as shown in FIG. 7. The first light-emitting element 133 is disposed on the circuit board 137 and accommodated in the first accommodating space H1. The first light-emitting element 133 has a light outputting surface 133a facing the light incident surface 435a3 and the first light guide pattern GP1. The second light-emitting element 134 is disposed on the circuit board 137 and accommodated in the second accommodating space H2. The second light-emitting element 134 has a light outputting surface 134a facing the light incident surface 435b3 and the second light guide pattern GP2. The cover plate 136 covers above the first light guide region 435a, the second light guide region 435b, and the light-shielding sheet 432. The cover plate 136 has a first pattern P1 and a second pattern P2 (not shown, but similar to that in FIG. 2) disposed corresponding to the first light guide pattern GP1 and the second light guide pattern GP2 respectively.

As shown in FIG. 8A, the first light guide pattern GP1 is spaced apart from the opening of the first notch N1 by a first distance. The first light guide pattern GP1 is spaced apart from the first light-emitting element 133 by a second distance. The second distance is greater than the first distance.

As shown in FIG. 8A, the light-shielding sheet 432 has a light blocking portion 432b1 disposed between the first light guide region 435a and the second light guide region 435b. In this way, the light blocking portion 432b1 of the light-shielding sheet 432 can isolate the light emitted by the first light-emitting element 133 and the second light-emitting element 134 without interfering with each other, so that the first pattern P1 and the second pattern P2 on the cover plate 136 can be displayed independently.

As shown in FIG. 8A, the light-shielding sheet 432 further has two light blocking portions 432b2 respectively at opposite sides of the opening of the first notch N1. On the other hand, the first notch N1 has a bottom opposite to the opening of the first notch N1. A width of the opening of the first notch N1 is smaller than a width of the bottom. In this way, the light transmitted in the light guide plate 435 will be blocked by the light blocking portions 432b2, and the opening of the first notch N1 having a smaller width can reduce light leakage.

In some other embodiments, one of the light blocking portions 432b2 may be omitted, and the width of the opening of the first notch N can be reduced.

As shown in FIG. 8A, in the present embodiment, the light guide plate 435 further includes a connecting portion 435c connected to the first light guide region 435a and the second light guide region 435b. In other words, the first notch N1 and the second notch N2 are communicated to each other. However, the present disclosure is not limited in this regard.

Figure 8B:
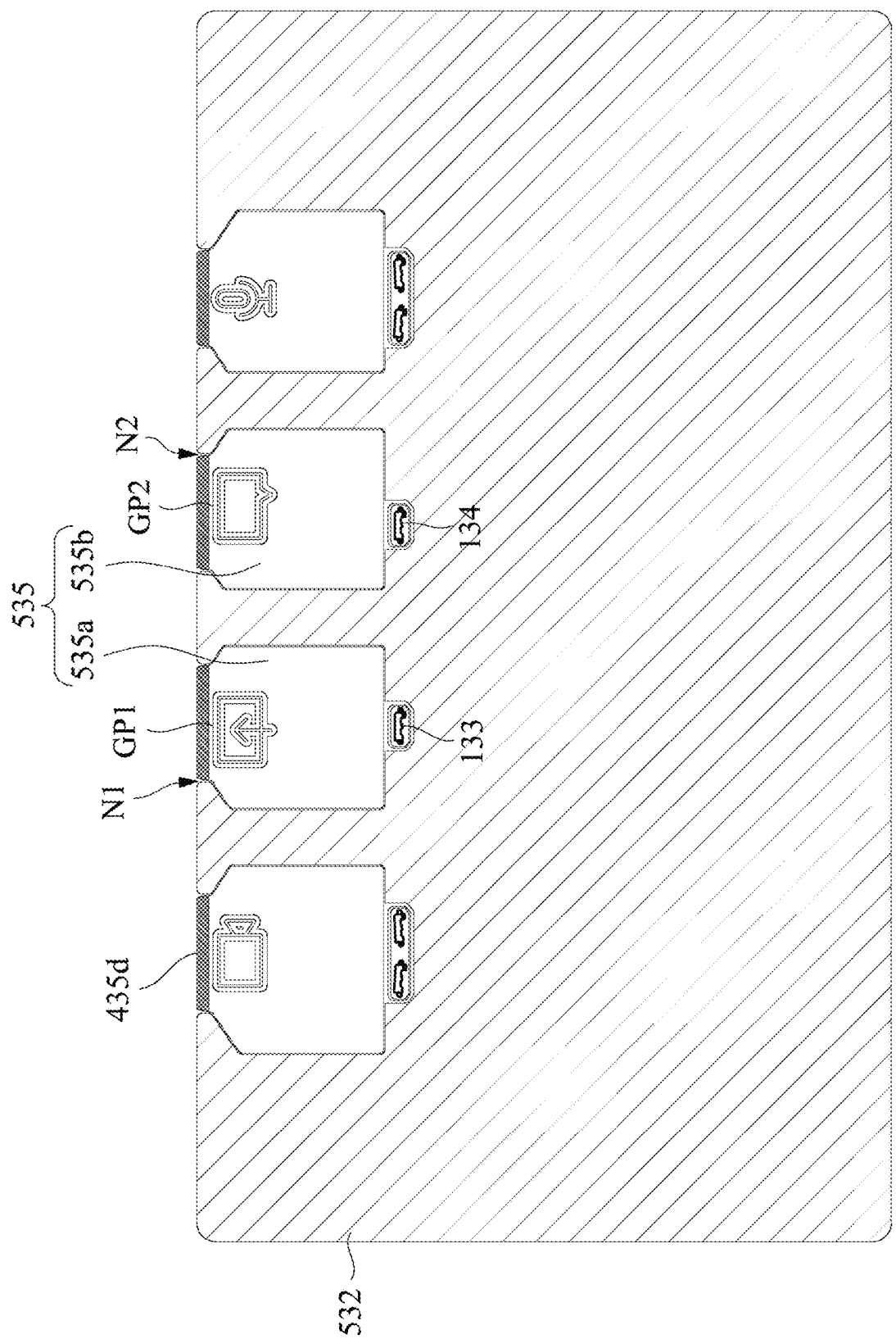
FIG. 8B is a front view of some components of an illuminated touch module according to another embodiment of the disclosure.

Reference is made to FIG. 8B. FIG. 8B is a front view of some components of an illuminated touch module according to another embodiment of the disclosure. Compared to the embodiment shown in FIG. 8A, the present embodiment provides a modified light-shielding sheet 532 and a modified light guide plate 535. Specifically, the light guide plate 535 includes a first light guide region 535a and a second light guide region 535b separated from each other. In other words, the first notch N1 and the second notch N2 are also separated from each other.

Figure 9:
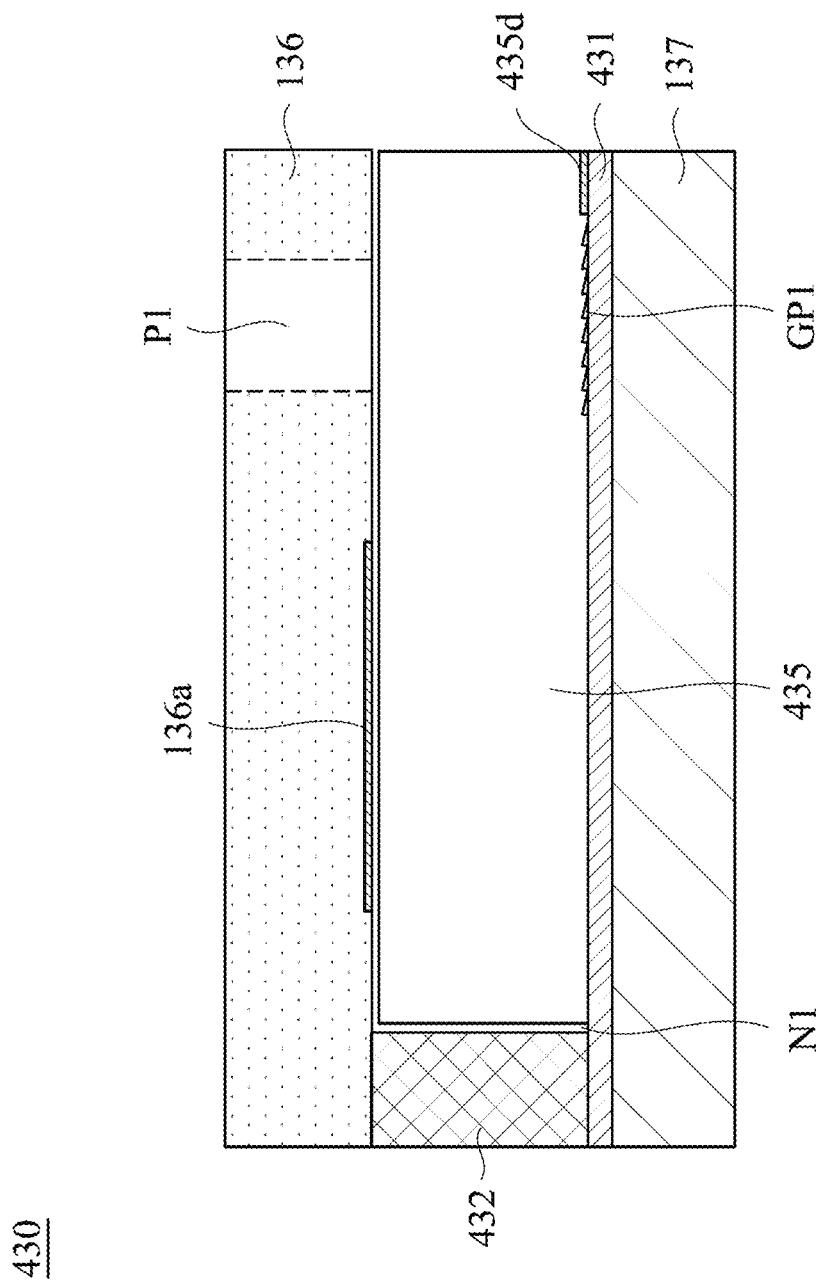
FIG. 9 is a schematic cross-sectional view of the illuminated touch module in FIG. 8A taken along line 9-9 according to an embodiment of the disclosure.

Reference is made to FIG. 9. FIG. 9 is a schematic cross-sectional view of the illuminated touch module 430 in FIG. 8A taken along line 9-9 according to an embodiment of the disclosure. As shown in FIGS. 8A and 9, in the present embodiment, the light guide plate 435 has a light-shielding area 435d disposed corresponding to the opening of the first notch N1. In this way, the light transmitted in the light guide plate 435 can be further prevented from laterally leaking by the light-shielding area 435d.

Figure 10:
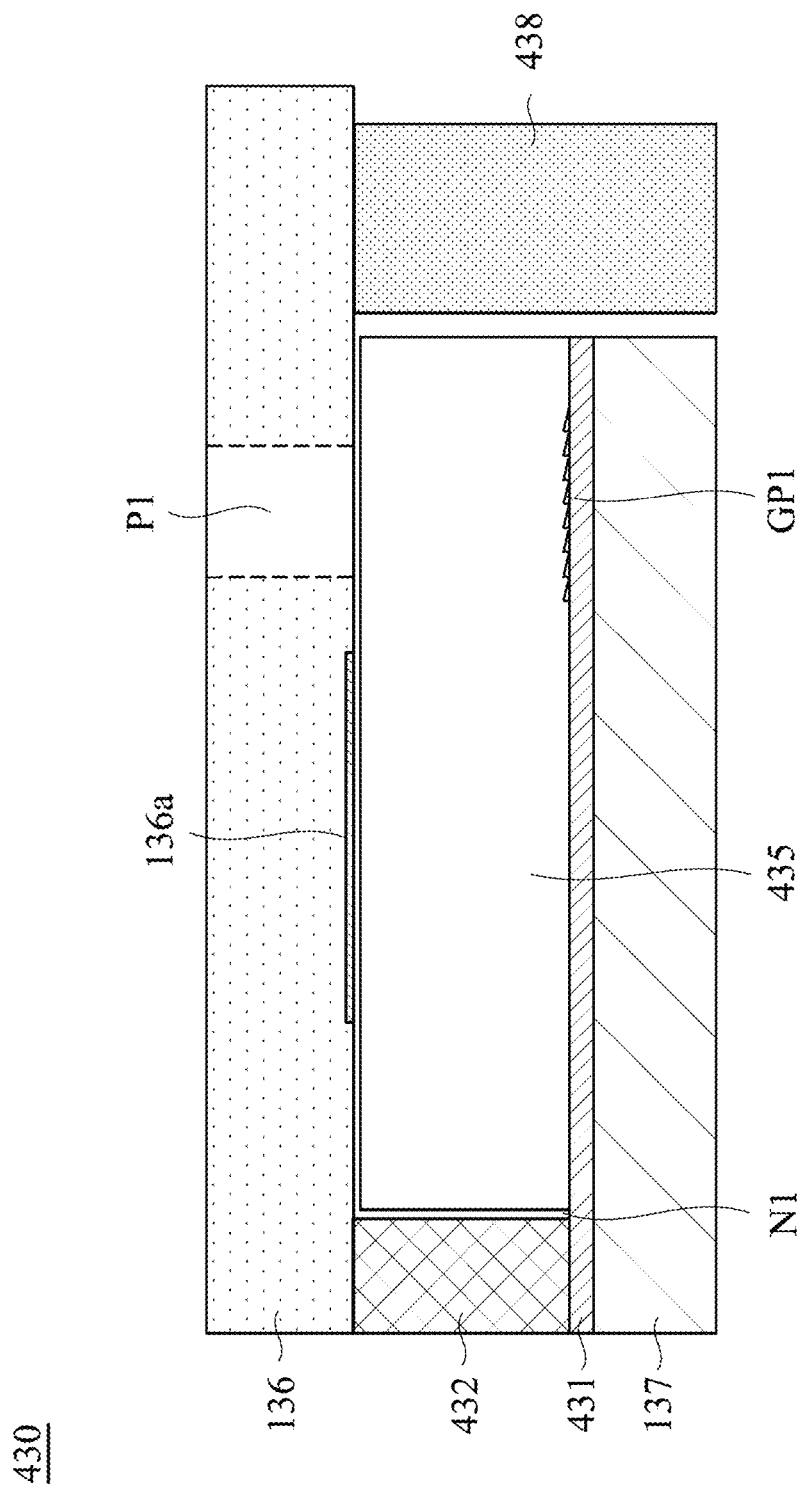
FIG. 10 is a schematic cross-sectional view of the illuminated touch module in FIG. 8A taken along line 9-9 according to another embodiment of the disclosure.

Reference is made to FIG. 10. FIG. 10 is a schematic cross-sectional view of the illuminated touch module 430 in FIG. 8A taken along line 9-9 according to another embodiment of the disclosure. As shown in FIGS. 8A and 10, in the present embodiment, the illuminated touch module 430 further includes a light-shielding element 438 at least covers the edge of the base sheet 431. Specifically, the light-shielding element 438 is disposed on a surface of the cover plate 136 facing the base sheet 431. In this way, the light transmitted in the light guide plate 435 can be further prevented from laterally leaking from the opening of the first notch N by the light-shielding element 438.

Figure 11:
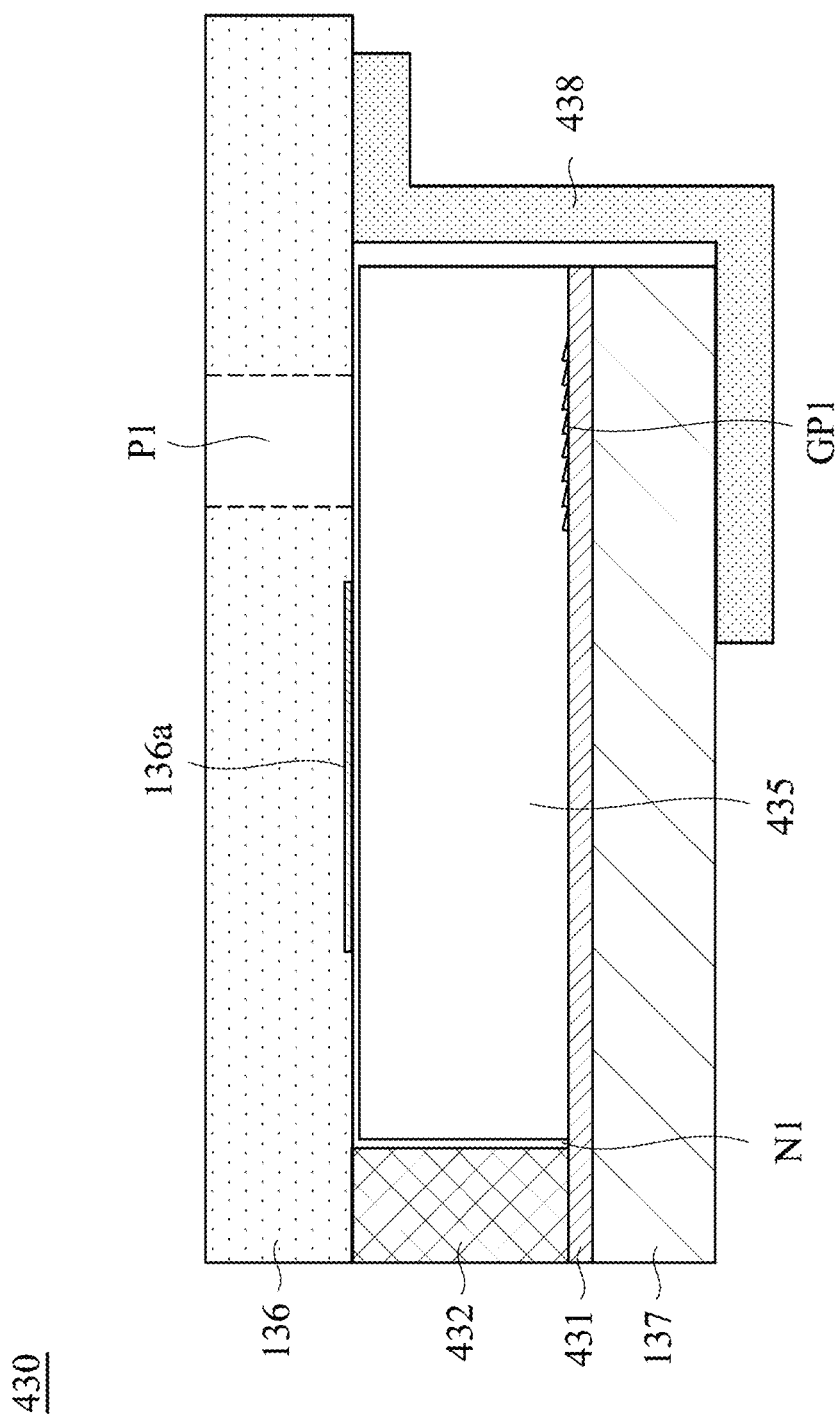
FIG. 11 is a schematic cross-sectional view of the illuminated touch module in FIG. 8A taken along line 9-9 according to another embodiment of the disclosure.

In some embodiments, the light-shielding element 438 is in the shape of a bump, but the present disclosure is not limited in this regard. Reference is made to FIG. 11. FIG. 11 is a schematic cross-sectional view of the illuminated touch module 430 in FIG. 8A taken along line 9-9 according to another embodiment of the disclosure. Compared to the light-shielding element 438 in FIG. 10, the light-shielding element 438 in FIG. 11 is in the shape of a plate and further extends to a surface of the circuit board 137 away from the cover plate 136. In some embodiments, the light-shielding element 438 may be adhered to the surface of the circuit board 137. In this way, the light-shielding element 438 in FIG. 11 can prevent the light transmitted in the light guide plate 435 from laterally leaking from the opening of the first notch N more completely.

Figure 12:
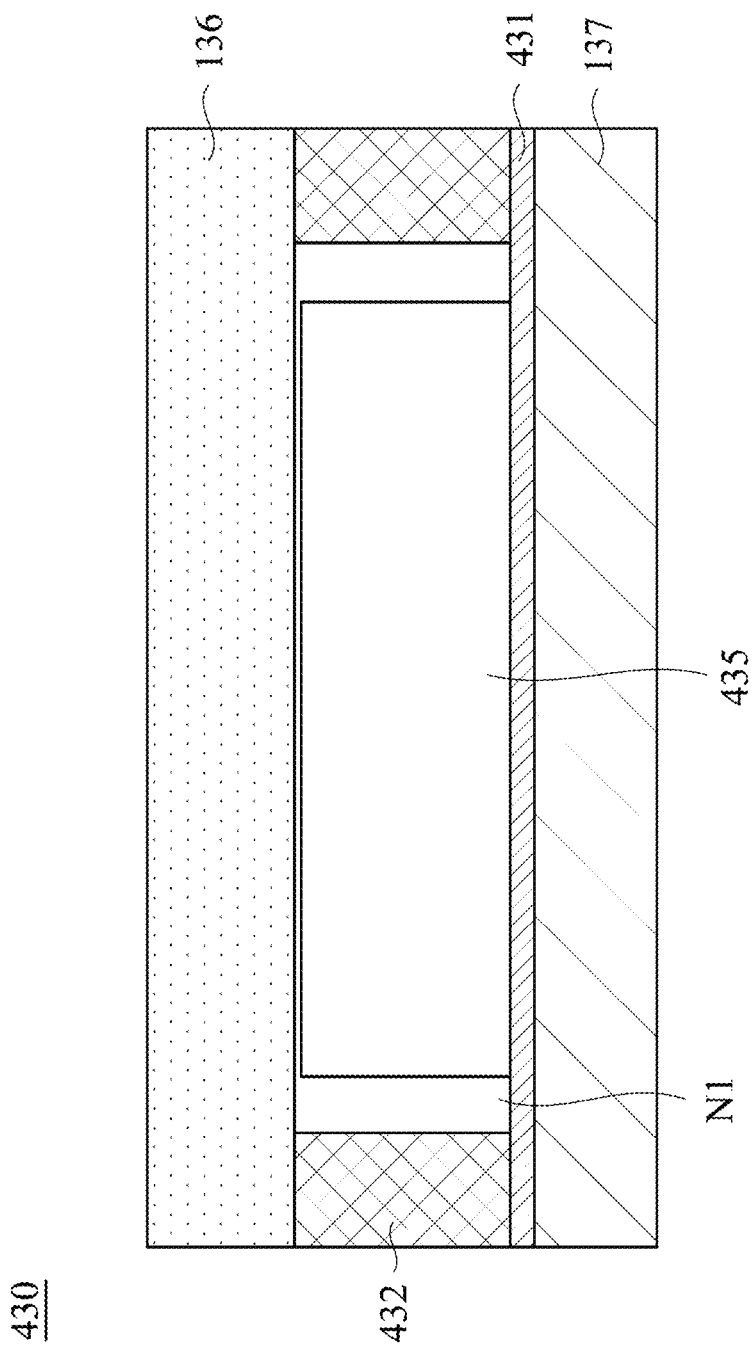
FIG. 12 is a schematic cross-sectional view of the illuminated touch module in FIG. 8A taken along line 12-12 according to an embodiment of the disclosure.

Reference is made to FIG. 12. FIG. 12 is a schematic cross-sectional view of the illuminated touch module 430 in FIG. 8A taken along line 12-12 according to an embodiment of the disclosure. As shown in FIGS. 8A and 12, in the present embodiment, both the light-shielding sheet 432 and the light guide plate 435 are in contact with the top surface of the base sheet 431. However, the present disclosure is not limited in this regard.

Figure 13:
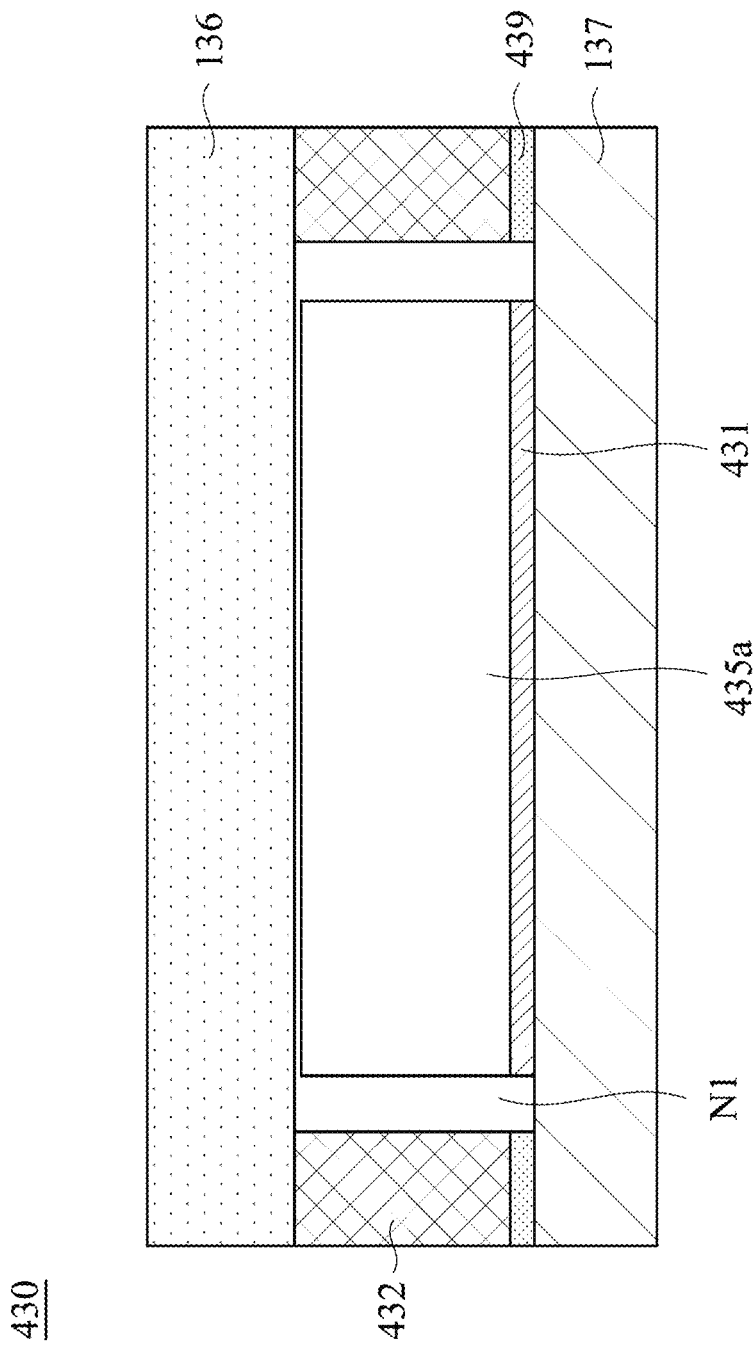
FIG. 13 is a schematic cross-sectional view of the illuminated touch module in FIG. 8A taken along line 12-12 according to another embodiment of the disclosure.

Reference is made to FIG. 13. FIG. 13 is a schematic cross-sectional view of the illuminated touch module 430 in FIG. 8A taken along line 12-12 according to another embodiment of the disclosure. As shown in FIGS. 8A and 13, in the present embodiment, the light guide plate 435 is in contact with the top surface of the base sheet 431, and the light-shielding sheet 432 is adhered to the circuit board 137 through an adhesive layer 439 and spaced apart from the base sheet 431.

Figure 14:
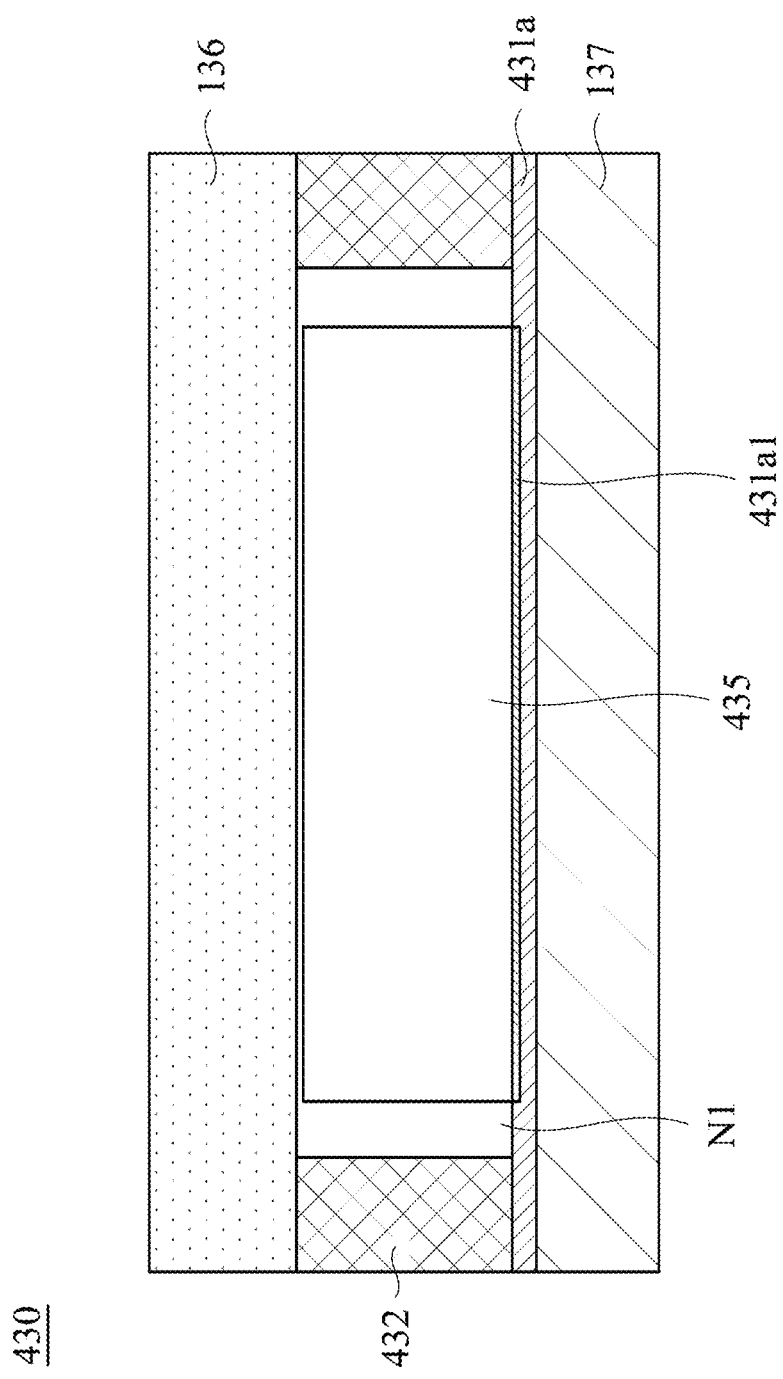
FIG. 14 is a schematic cross-sectional view of the illuminated touch module in FIG. 8A taken along line 12-12 according to another embodiment of the disclosure.

Reference is made to FIG. 14. FIG. 14 is a schematic cross-sectional view of the illuminated touch module 430 in FIG. 8A taken along line 12-12 according to another embodiment of the disclosure. As shown in FIGS. 8A and 14, in the present embodiment, both the light-shielding sheet 432 and the light guide plate 435 are in contact with the top surface of the base sheet 431a. Compared to the base sheet 431 in FIG. 12, the base sheet 431a in the present embodiment is a black plastic sheet having a light reflection area 431a1 on the top surface of the base sheet 431a. For example, the material of the black plastic sheet includes PET (polyethylene terephthalate), but the present disclosure is not limited in this regard. The light reflection area 431a1 is in contact with the bottom surface of the light guide plate 435 and spaced apart from the light-shielding sheet 432. For example, the light reflection area 431a1 is in contact with an entirety of the bottom surface of the light guide plate 435, but the present disclosure is not limited in this regard.

Figure 15:
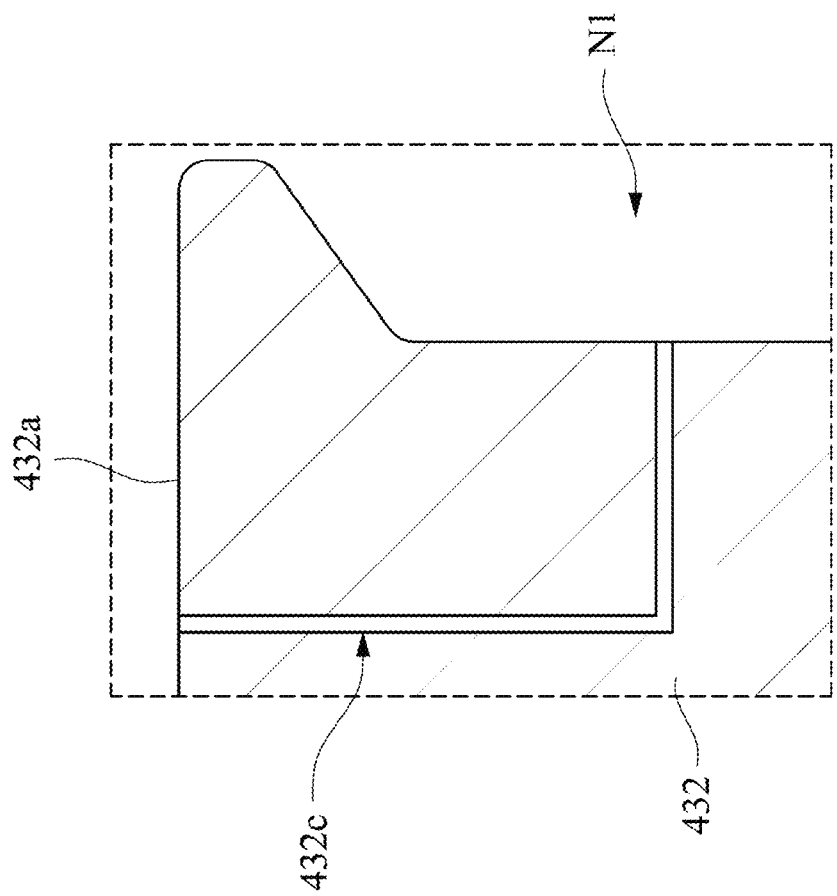
FIG. 15 is a partial front view of the light-shielding sheet according to another embodiment of the disclosure.

Reference is made to FIG. 15. FIG. 15 is a partial front view of the light-shielding sheet 432 according to another embodiment of the disclosure. As shown in FIG. 15, in the present embodiment, the light-shielding sheet 432 further has an air passage 432c communicating the first notch N1 to the side surface 432a. In this way, heat generated in the first notch N1 by the first light-emitting element 133 can be dissipated away from the first notch N1 via the air passage 432c.

As shown in FIG. 15, in the present embodiment, the air passage 432c extends curvedly from the first notch N1 to the side surface 432a. In this way, the light leaving the light guide plate 435 and entering the air passage 432c needs to go through at least one turn before reaching the side surface 432a, thereby avoiding light leakage occurred from the outlet of the air passage 432c at the side surface 432a.

According to the foregoing recitations of the embodiments of the disclosure, it can be seen that in the illuminated touch module of the present disclosure, the first light-emitting element and the second light-emitting element emit light toward the first light guide region and the second light guide region of the light guide plate, respectively. Moreover, the light guide plate is embedded in the hollow portion or the notch of the light-shielding sheet, and the light blocking portion of the light-shielding sheet is disposed between the first light guide region and the second light guide region. In this way, the light blocking portion of the light-shielding sheet can isolate the light emitted by the first light-emitting element and the second light-emitting element without interfering with each other, so that the first pattern and the second pattern on the cover plate can be displayed independently. In some embodiments, at least one of the first light-emitting element and the second light-emitting element is disposed on the wall surface of the hollow portion and configured to emit light toward the light blocking portion, or disposed on the wall surface of the light blocking portion and configured to emit light away from the light blocking portion. In some embodiments, the light guide plate has a connecting portion with two ends respectively connected to the first light guide region and the second light guide region, and the connecting portion has a bent portion. In this way, the light emitted by the first light-emitting element needs to go through more than two turns before reaching the second light guide region, or the light emitted by the second light-emitting element needs to go through more than two turns before reaching the first light guide region, thereby ensuring that the light emitted by the first light-emitting element and the second light-emitting element do not interfere with each other. Moreover, compared with separated light guide blocks, connecting the first light guide region and the second light guide region by the connecting portion as disclosed in the present embodiment can facilitate the assembly and alignment of the light guide plate.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An illuminated touch module, comprising:
 a base sheet disposed on a circuit board and having a top surface, the top surface having a light reflection area;
 a light-shielding sheet disposed above the base sheet and having a side surface and a notch recessed from the side surface, an opening of the notch being aligned with an edge of the base sheet;
 a light guide plate embedded in the notch and located above the light reflection area, wherein the light guide plate has a light guide pattern formed by a plurality of microstructures and has a light incident surface;
 a light-emitting element disposed on the circuit board and having a light outputting surface facing the light incident surface and the light guide pattern; and
 a cover plate covering above the light guide plate and the light-shielding sheet.

2. The illuminated touch module of claim 1, wherein the light guide pattern is spaced apart from the opening of the notch by a first distance, the light guide pattern is spaced apart from the light-emitting element by a second distance, and the second distance is greater than the first distance.

3. The illuminated touch module of claim 2, wherein the light-shielding sheet has a light blocking portion at a side of the opening of the notch.

4. The illuminated touch module of claim 3, wherein the light guide plate has a light-shielding area disposed corresponding to the opening of the notch.

5. The illuminated touch module of claim 1, further comprising a light-shielding element at least covers the edge of the base sheet.

6. The illuminated touch module of claim 5, wherein the light-shielding element is disposed on a surface of the cover plate facing the base sheet.

7. The illuminated touch module of claim 6, wherein the light-shielding element further extends to a surface of the circuit board away from the cover plate.

8. The illuminated touch module of claim 1, wherein the light-shielding sheet is adhered to the circuit board through an adhesive layer and spaced apart from the base sheet.

9. The illuminated touch module of claim 1, wherein the light-shielding sheet further has an air passage communicating the notch to the side surface.

10. The illuminated touch module of claim 9, wherein the air passage extends curvedly from the notch to the side surface.

11. An illuminated touch module, comprising:
 a base sheet disposed on a circuit board and having a top surface, the top surface having a first light reflection area and a second light reflection area;
 a light-shielding sheet disposed above the base sheet and having a side surface, a first notch, and a second notch, the first notch and the second notch being recessed from the side surface, an opening of the first notch and an opening of the second notch being aligned with an edge of the base sheet;
 a light guide plate comprising a first light guide region and a second light guide region respectively embedded in the first notch and the second notch and respectively located above the first light reflection area and the second light reflection area, wherein the first light guide region has a first light guide pattern formed by a plurality of microstructures and has a first light incident surface, and the second light guide region has a second light guide pattern formed by a plurality of microstructures and has a second light incident surface;
 a first light-emitting element disposed on the circuit board and having a light outputting surface facing the first light incident surface and the first light guide pattern of the first light guide region;
 a second light-emitting element disposed on the circuit board and having a light outputting surface facing the second light incident surface and the second light guide pattern of the first light guide region; and
 a cover plate covering above the first light guide region, the second light guide region, and the light-shielding sheet and having a first pattern and a second pattern disposed corresponding to the first light guide pattern and the second light guide pattern respectively,
 wherein the first light guide pattern is spaced apart from the opening of the first notch by a first distance, the first light guide pattern is spaced apart from the first light-emitting element by a second distance, and the second distance is greater than the first distance.

12. The illuminated touch module of claim 11, wherein the first light guide region has a light-shielding area disposed corresponding to the opening of the first notch.

13. The illuminated touch module of claim 11, wherein the first notch has a bottom opposite to the opening of the first notch, and a width of the opening of the first notch is smaller than a width of the bottom.

14. The illuminated touch module of claim 11, further comprising a light-shielding element at least covers the edge of the base sheet.

15. The illuminated touch module of claim 14, wherein the light-shielding element is disposed on a surface of the cover plate facing the base sheet.

16. The illuminated touch module of claim 15, wherein the light-shielding element further extends to a surface of the circuit board away from the cover plate.

17. The illuminated touch module of claim 11, wherein the light-shielding sheet is adhered to the circuit board through an adhesive layer and spaced apart from the base sheet.

18. The illuminated touch module of claim 11, wherein the light-shielding sheet further has an air passage communicating the first notch to the side surface.

19. The illuminated touch module of claim 18, wherein the air passage extends curvedly from the first notch to the side surface.

20. The illuminated touch module of claim 11, wherein the light guide plate further comprises a connecting portion connected to the first light guide region and the second light guide region.

* * * * *